INTELLIGENCE TRANSMISSION SYSTEM

Filed July 21, 1952 2 Sheets-Sheet 1

INVENTOR.
PAUL RAIBOURN
BY Howard J. Murray, Jr.
AGENT

April 29, 1958 P. RAIBOURN 2,832,817

INTELLIGENCE TRANSMISSION SYSTEM

Filed July 21, 1952 2 Sheets-Sheet 2

INVENTOR.
PAUL RAIBOURN
BY Howard J. Murray, Jr.
AGENT

United States Patent Office 2,832,817

Patented Apr. 29, 1958

2,832,817

INTELLIGENCE TRANSMISSION SYSTEM

Paul Raibourn, Southport, Conn.

Application July 21, 1952, Serial No. 300,050

5 Claims. (Cl. 178—5.4)

The present invention is directed to the transmission of intelligence signals. In one embodiment it relates to the transmission of information capable of reproducing an image in substantially its natural colors.

It has recently been demonstrated that a fully compatible color television system is possible in which two or more signals, representative of different aspects of the image being televised, occupy at least in part the same portion of the assigned channel. In other words, these signals "overlap," with the result that much higher resolution may be achieved than in frequency-division multiplex systems employing separate narrow portions of the spectrum for the transmission of each image characteristic. Frequency-interlace, as the above may be termed, has a number of variants, one of which utilizes a picture carrier for the mixed highs of the image plus its green color characteristics, a red modulated sub-carrier overlapping this picture carrier, and a blue sub-carrier located in the gap between the picture signal and the sound channel. Other arrangements incorporating the same basic principle include the employment of a picture carrier for the brightness components of an image, a second carrier for information as to one primary color, and a third carrier for a further primary color. However, if desired, the same carrier wave may be differently modulated for each color instead of actually using separate carriers. The remaining primary may then be derived from these two color signals. A still further arrangement makes use of a primary carrier with is sidebands for transmission of the brightness components of an image, while a color subcarrier with its sidebands is utilized for hue plus saturation (color minus brightness) transmission. Although these two signals when added together produce color, it is desirable to isolate them during transmission in order to improve the quality of color rendition. Since the color subcarrier is of negligible amplitude during the scanning of white or grey areas, the image structure produced by such a design lacks the "dot" pattern which has frequently proven to be objectionable when other forms of frequency-interlacing are used. One arrangement along these lines is described in an article by B. D. Loughlin entitled "Recent improvements in band-shared simultaneous color television systems" and appearing in the October 1951 issue of the "Proceedings of the Institute of Radio Engineers."

Proposals of the above nature are based upon the principle of "frequency-interleaving" of sideband components. This permits the transmission of both carrier and subcarrier waves in the same region of the spectrum, limited only in that the subcarrier frequency $f_s$ must be an odd multiple of half the line-scanning frequency $f_1$ according to the relationship $$f_s=\frac{(2k+1)f_1}{2}$$

where $k$ is a whole number such as 0, 1, 2, 3, etc. However, it is difficult to prevent "beating" or other interaction between the signals, resulting in spurious receiver patterns. For example, a "shimmering" effect may be produced by brightness signal cross-talk into the chromaticity channel. This is true in some degree even when the brightness component is assigned a separate signal path at the receiver in the attempt to preclude variations in hue and saturation from causing noticeable changes in the luminance of the reproduced image.

For the above reasons, it would be desirable to locate the brightness signal in a portion of the frequency spectrum not occupied by the color subcarrier, or, in other words, to eliminate the "overlapping" of these signals. However, this has not been possible under present conditions due to the necessity of compressing within a passband of approximately 6 megacycles all of the video and audio information carried by a single channel. Actual widening of the individual channels has been determined to be economically unfeasible due to the large number of stations which must be accommodated within a limited portion of the available frequency spectrum.

In accordance with a principal feature of the present invention, a color television system is provided in which a particular channel may carry in its entirety only one of the two or more signals necessary for three-color reproduction. The remaining signal or signals, such for example as the color subcarrier, may have at least a portion located in one of the guard bands for that channel, in either immediately adjacent channel, or elsewhere. There are two conditions that must then be fulfilled—firstly, that the frequency of the latter signal or signals be synchronized according to the previously-stated relationship at an odd multiple of one-half the line-scanning frequency of the signal, if any, in that particular portion of the frequency spectrum where it is located, and, secondly, that the receiver be so designed as to permit reception of the channel in question over a range sufficiently wide to include at least a part of the information carried by the said auxiliary signal or signals. Inasmuch as the present method of allocating channels in any one locality provides that at least one band immediately adjacent to a particular channel be unoccupied, the problem of cross-talk should not be a factor. Even when such allocation conditions do not prevail, however, the maintaining of a frequency-interleaved relationship between the auxiliary signal or subcarrier of the channel in question, on one hand, and the principal carrier of another channel, on the other, should cause any resulting interference in the latter channel to appear as an overall gray pattern at the receiver, having such a low level of visibility as to be almost unnoticeable to an observer. Then, too, a large percentage of the energy in a radiated signal lies in the sidebands adjacent to the carrier. The wider the separation between the picture carrier of a particular channel, therefore, and the color subcarrier of that channel, the higher will be the frequency and the lower will be the amplitude of any heat energy developed by interaction of these signals. Hence the less visible will be such interference on the screen of the image-reproducing tube, and the clearer will be the picture presented to an observer, since his eye will integrate the high-frequency, low-energy "dots" into an overall gray shading which is in no sense objectionable.

One object of the present invention, therefore, is to provide an improved system for the transmission of intelligence signals.

A further objective of the invention is to provide a system of intelligence transmission in which separate carriers carrying two aspects of an intelligence signal are transmitted through distinct portions of the frequency spectrum, one of these portions being normally occupied at least in part by a signal carrying unrelated intelligence, but having its transmission synchronized with the transmission of the first mentioned signal.

Another object of the invention is to provide an improved color television system of the type in which information respecting the brightness component of a particular signal is transmitted on a carrier within a particular channel, and information respecting the color component of said signal is transmitted on a subcarrier at least in part exterior to said particular channel.

Other objects and advantages will be apparent from the following description of a preferred form of the invention and from the drawings, in which:

Figure 1 illustrates one possible set of frequency relationships that prevail when my invention is applied to a color television system. However, it will be recognized that the disclosure is generic to any form of intelligence transmission, such as subscription or "pay-as-you-see" television, where additional information (such as a key or code) is sent along with a particular signal.

The three channels illustrated, N−1, N, and N+ may be adjacent television channels within a given area. It is obvious that under conventional practice no appreciable overlapping or cross-talk is permissible without serious picture contamination, and hence all of the information in each channel must be strictly confined to a frequency band which under present regulations is approximately six megacycles in width.

Figure 1:
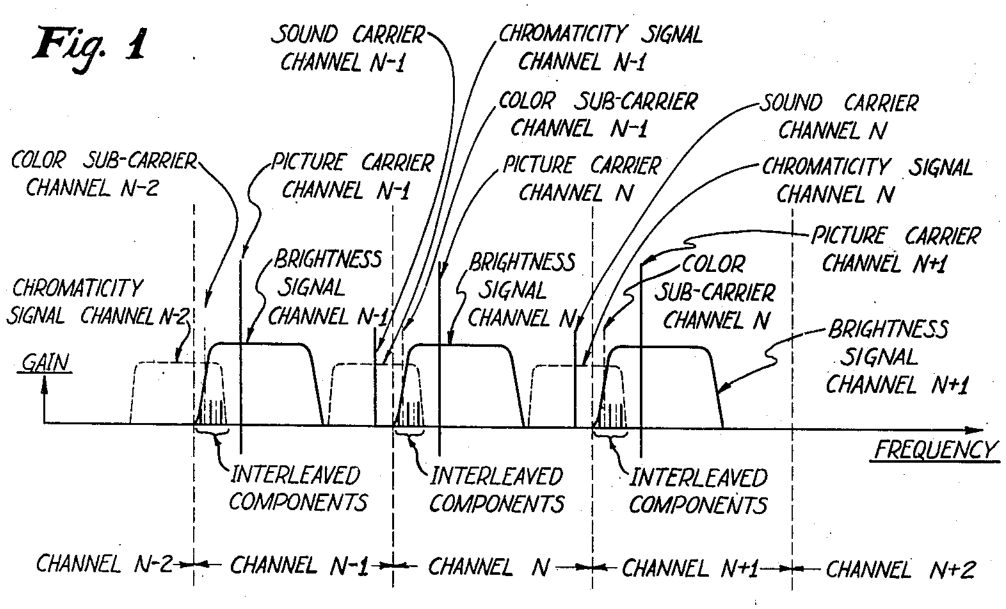
Figure 1 is an explanatory curve illustrating transmitter characteristics and signal relationships in accordance with the present invention.

In the system described in the above-identified Loughlin article, the color information in a particular channel, such as N in Figure 1 of the present drawings, shares the same portion of the spectrum as the brightness information, this being accomplished by frequency-interleaving the sidebands of the main brightness carrier with those of the color subcarrier. While this effects a reduction in signal interaction, enough interference still persists in many cases to produce undesirable patterns in the reproduced image. In accordance with one feature of the present invention, the color signal of channel N, for example, is not located in channel N in its entirety, but instead falls partially within the adjacent channel, N+1. Optionally, it may be located in channel N+1 in its entirety, as will later be evident. No interference between the channel N color signal and the brightness signal of channel N+1 exists, however, because the channel N color subcarrier frequency $N_{sub}$ is chosen to be an odd multiple of one-half the line-scanning frequency $f_l$ of channel N+1 according to the relationship $$N_{sub}=\frac{(2k+1)f_l}{2}$$

where $k$ is a whole number such as 0, 1, 2, 3, etc. Synchronization between the two signals of channels N and N+1 is necessary, of course, and can be obtained in many ways, including one to be described in connection with the system of Figure 2. In the same manner, channel N+2 contains the brightness signal of channel N+2 in addition to at least part of the chromaticity signal of channel N+1, and so on. It will now be apparent that the location of the color subcarrier of any particular channel is unimportant as long as its frequency is chosen so as not to interfere with the signal (if any) already present at such location, and as long as the receiver is designed with a passband wide enough to encompass such subcarrier wherever it may be located.

Figure 2:
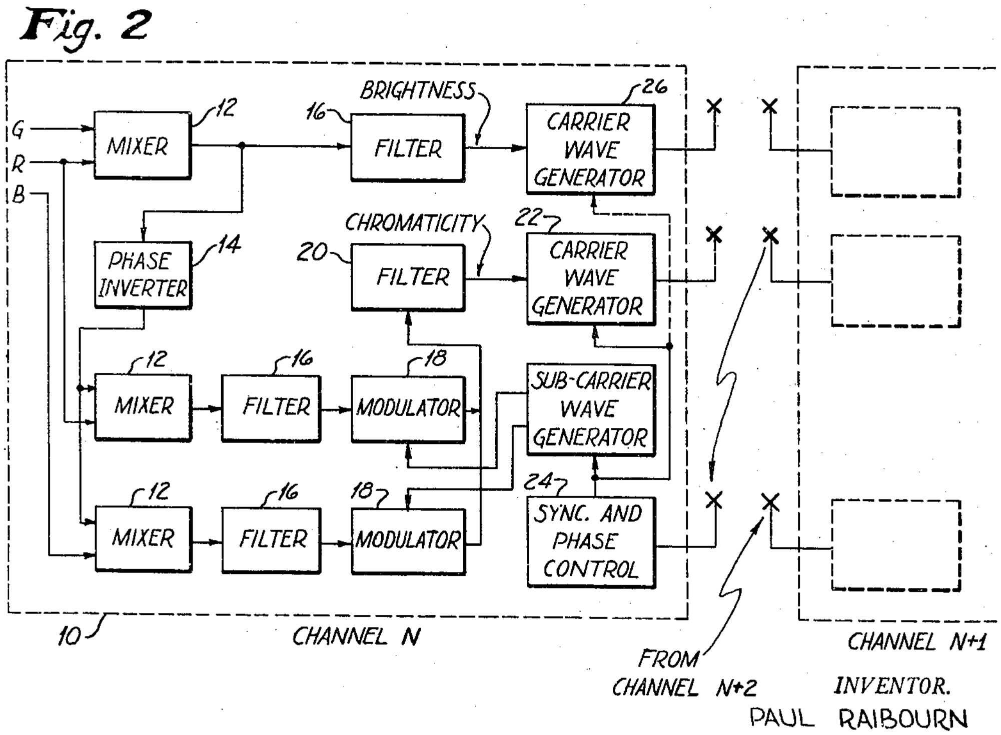
Figure 2 is a block diagram showing one method of practicing the present invention.

In Figure 2 is shown a block diagram as one form of color television transmitter adapted to carry out the principles of the present invention. The signal mixers 12, the phase inverter 14, the filters 16, and the modulators 18 included in transmitter 10 are fully described and their functions set forth in the above-mentioned Loughlin article, and reference is made to such publication for the details of their operation. It will merely be said herein that the green "G," red "R" and blue "B" signals from the camera tube are combined to give a wide-band signal "Y" and narrow band "R−Y" and "B−Y" signals. The "Y" signal is transmitted as the normal video, or brightness, signal, and the "R−Y" and "B−Y" signals modulate a subcarrier in quadrature. Assuming that the transmitter 10 is designed to transmit a signal through channel N, the essence of applicant's invention (as applied to a system of this nature) is the application of the color subcarrier (the "R−Y" and "B−Y" signals constituting the output of the modulators 18 and filter 20) to a carrier wave generator 22 which has a center frequency lying outside channel N, as for example in channel N+1.

Reference is again made to Figure 1 for the resulting frequency relationships. It will be seen that the color signal of channel N will interfere with the brightness signal of channel N+1 unless the two carriers are so chosen that the sidebands interleave as shown in the drawing. To bring this about, a signal from channel N+1 is picked up and applied to a synchronizing and phase control circuit 24 of channel N. This circuit 24 serves to stabilize relative to the signal frequency of channel N+1 the frequency of the carrier wave generator receiving the chromaticity signal from filter 20. It will be appreciated by those skilled in the art that other ways of synchronizing the transmitters of channels N and N+1 are well known, and might include use of a telephone wire between the two stations, for example. Any such method of relating the frequencies of two such channels is deemed to be within the scope of the present invention.

Figure 3:
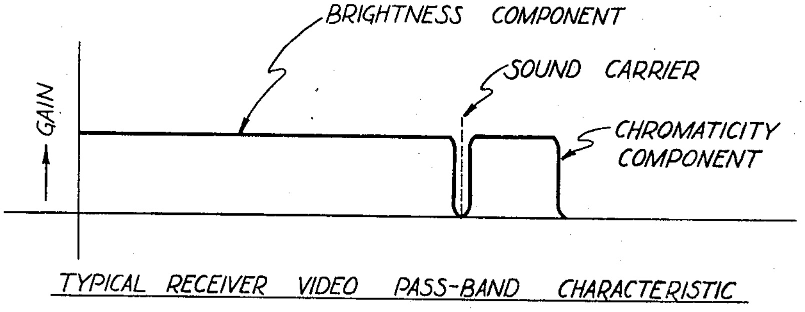
Figure 3 illustrates the passband characteristics of a receiver such as might be employed with the present invention.

In order to insure that the receiver, when tuned to channel N, for example, will pick up the brightness signal which is in channel N as well as its associated chromaticity signal which lies in channel N+1, such receiver may be designed with a passband as shown in Figure 3. This will not result in objectionable interference from the brightness signal of channel N+1, since this channel, as previously mentioned, is not normally allocated in the same locality as channel N. Hence, its signal level is low, and since the chromaticity signal of channel N utilizes only a relatively small portion of the channel passband (as shown in Figure 1) the receiver operates at a low point on the brightness signal characteristic of channel N+1. However, if desired, suitable filter or selective networks, well known in the television art, may be employed in the color circuits preceeding the image-reproducing tube.

Figure 4:
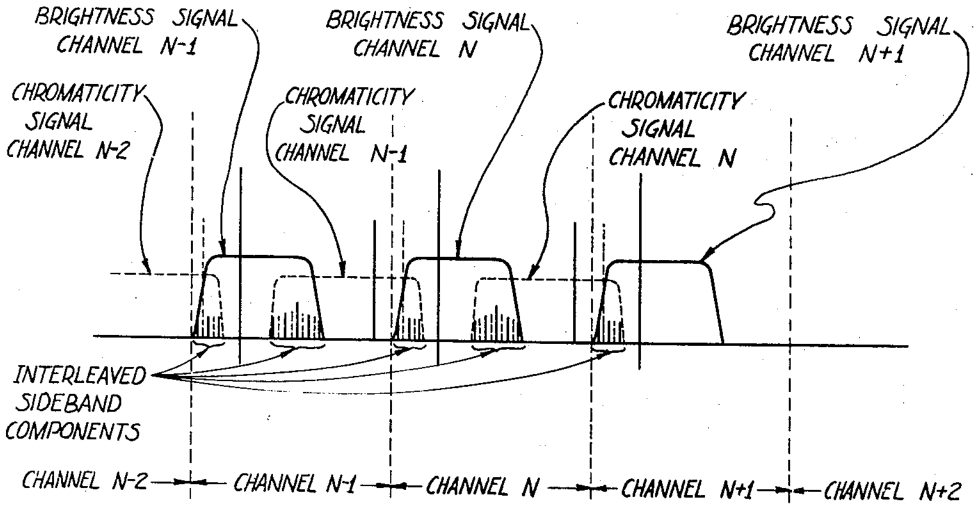
Figure 4 is an explanatory curve illustrating transmitter characteristics and signal relationships in accordance with a modification of the present invention.

In Figure 4 is illustrated another set of transmitter characteristics and signal relationships in accordance with a further embodiment of the invention. It will be recognized that, whereas in Figure 1 the brightness signal of channel N, for example, does not extend into that portion of the channel passband occupied by the chromaticity signal, nevertheless it may in some cases be desirable to have these two signals overlap in a manner now known in the art. Such a condition is illustrated in Figure 4, where the brightness and chromaticity signals of each channel share a common portion of the channel bandwidth. Although this arrangement permits the utilization of higher-frequency components of the brightness signals, it includes the possibility of cross-talk between the two component signals of one channel and hence is less desirable for some applications than is the system of Figure 1 where such interference is not a factor.

In order to prevent serious picture contamination when the system of Figure 4 is employed, not only must the color subcarrier of one channel (such as N) be synchronized at a frequency which is equal to an odd multiple of one-half the line-scanning frequency of the brightness signal in channel N+1, but in addition such channel N color signal must be synchronized as to bear the same relationship to the brightness signal of its own channel N. The sideband components of the brightness and color signals of channel N will also interleave, when this condition is fulfilled, as shown in Figure 4.

To accomplish the above the output of the synchronizing and phase control circuit 24 of channel N (see Figure 2) is fed not only to the carrier wave generator 22 for the color subcarrier, but also to the carrier wave generator 26 for the principal or brightness carrier, as illustrated by the broken line in the drawing. Thus, synchronization of all three signals for channel N is brought about, and a similar synchronization is carried out for the signals in all other channels to which applicant's invention is applied.

Although I have illustrated and described certain novel features of my invention, it will be appreciated that various omissions, substitutions and changes may be made by those skilled in the art within the scope of the appended claims.

I claim:

1. In a television system wherein a plurality of color television signals are respectively transmitted through a plurality of channels of limited bandwidth occupying adjacent portions of the frequency spectrum, each such color television signal including a separate component signal representative of the brightness of the televised image and at least one other component signal representative of its chromaticity, the method of effectively broadening the bandwidth of a particular one of said channels which comprises transmitting the separate brightness component of the color television signal of that particular channel on a principal carrier wave the effective sidebands of which lie substantially wholly within said particular channel, transmitting the separate chromaticity component of the color television signal of said particular channel on a subcarrier wave the effective sidebands of which lie at least partly within a channel immediately adjacent to said particular channel, the frequency of said subcarrier wave being stabilized at a frequency equal to an odd multiple of one-half the line-scanning frequency of the brightness signal component of the adjacent channel, to avoid interference between the signals of adjacent channels, and synchronizing said chromaticity component signal with the brightness component of the color television signal in said immediately adjacent channel.

2. The method of claim 1, in which the chromaticity component signal transmitted on said subcarrier wave has its sidebands frequency-interleaved with the sidebands of the brightness component of the color television signal in said immediately adjacent channel, thereby to preclude any appreciable interaction therebetween of a nature resulting in spurious patterns at a receiver.

3. In a communication system wherein a plurality of intelligence signals are respectively transmitted through a plurality of channels of limited bandwidth occupying adjacent portions of the frequency spectrum, each such intelligence signal including at least two component signals conveying characteristic information respecting said intelligence, the method of effectively broadening the bandwidth of each of said channels which comprises transmitting one of the component signals associated with the intelligence signal of a particular channel on a principal carrier wave the effective sidebands of which lie substantially wholly within said particular channel, transmitting another of the component signals associated with the intelligence signal of said particular channel on a subcarrier wave the effective sidebands of which lie at least partly within a channel immediately adjacent to said particular channel, selecting and stabilizing the sideband frequencies of said subcarrier wave so that said sideband frequencies are interleaved with the sidebands of the intelligence signal in the immediately adjacent channel, and synchronizing the frequency of said subcarrier wave with the intelligence signal in said immediately adjacent channel.

4. In a communication system wherein a plurality of intelligence signals are respectively transmitted through a plurality of channels of limited bandwidth occupying different portions of the frequency spectrum, each such intelligence signal including at least two component signals conveying characteristic information respecting said intelligence, the improvement which comprises effectively broadening the bandwidth of each of said channels, said improvement including means for transmitting one of the component signals associated with the intelligence signal of a particular channel on a principal carrier wave the effective sidebands of which lie substantially wholly within said particular channel, means for transmitting another of the component signals associated with the intelligence signal of said particular channel on a subcarrier wave the effective sidebands of which lie at least partly within another channel in the frequency spectrum occupied by another of said intelligence signals, means selecting and determining the frequency of said subcarrier wave so that the side band frequencies of said subcarrier wave are interleaved with the sidebands of said other intelligence signal, and means for synchronizing said subcarrier wave with the said other intelligence signal.

5. In a communication system wherein a plurality of color television signals are respectively transmitted through a plurality of channels of limited bandwidth occupying adjacent portions of the frequency spectrum, each such color television signal including a separate component signal representative of the brightness of the televised image and at least another component signal representative of its chromaticity, the improvement which comprises effectively broadening the bandwidth of each of said channels, said improvement including means for transmitting one of the component signals associated with the intelligence signal of a particular channel on a principal carrier the effective sidebands of which lie substantially wholly within said particular channel, means for transmitting the separate chromaticity component of the color television signal of the particular channel on a subcarrier wave, the effective side bands of which lie at least partly within a channel immediately adjacent to said particular channel, means selecting and determining the frequency of said subcarrier wave at a frequency equal to an odd multiple of one half the line scanning frequency of the brightness signal component of the said immediately adjacent channel, to preclude any appreciable interaction therebetween of a nature resulting in spurious patterns at a receiver, and means for synchronizing said chromaticity component signal with the brightness component of the color television signal in said immediately adjacent channel.

References Cited in the file of this patent

UNITED STATES PATENTS

| | | |
|---|---|---|
| 1,769,919 | Gray | July 8, 1930 |
| 2,580,903 | Evans | Jan. 1, 1952 |
| 2,599,643 | Kell | June 10, 1952 |
| 2,635,140 | Dome | Apr. 14, 1953 |
| 2,644,942 | Bedford | July 7, 1953 |

OTHER REFERENCES

Principles of NTSC Compatible Color Television Electronics, February 1952, pages 88–97. (Copy in U. S. Patent Office Lib.)

A Study of Co-Channel and Adjacent Channel Interference of Television Signals, Part I, pages 2–16, and Part II, pages 1–7 inclusive, published by RCA, January 1950. (Copy in Div. 16.)